US009767842B2

United States Patent
Hutchins

(10) Patent No.: US 9,767,842 B2
(45) Date of Patent: Sep. 19, 2017

(54) ASYNCHRONOUS ASYMMETRY COMPENSATION FOR DATA READ FROM A STORAGE MEDIUM

(71) Applicant: International Business Machines Corporation, Armonk, NY (US)

(72) Inventor: Robert A. Hutchins, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 83 days.

(21) Appl. No.: 14/848,198

(22) Filed: Sep. 8, 2015

(65) Prior Publication Data

US 2016/0012847 A1    Jan. 14, 2016

Related U.S. Application Data

(63) Continuation of application No. 14/331,169, filed on Jul. 14, 2014, now Pat. No. 9,159,358.

(51) Int. Cl.
*G11B 5/09* (2006.01)
*G11B 5/035* (2006.01)
(Continued)

(52) U.S. Cl.
CPC .......... *G11B 20/10324* (2013.01); *G11B 5/02* (2013.01); *G11B 20/10009* (2013.01);
(Continued)

(58) Field of Classification Search
CPC ........ G11B 20/10324; G11B 20/10055; G11B 20/10046; G11B 20/10027;
(Continued)

(56) References Cited

U.S. PATENT DOCUMENTS

| 5,877,644 A | 3/1999 | Christensen et al. |
| 5,920,438 A | 7/1999 | Christensen et al. |
(Continued)

FOREIGN PATENT DOCUMENTS

EP    1526512 A1    4/2005

OTHER PUBLICATIONS

Dee et al., "Advanced Multi-Track Tape Head for High Performance Tape Recording Application," IEEE Transactions on Magnetics, vol. 35, No. 2, Mar. 1999, pp. 712-717.
(Continued)

*Primary Examiner* — Andrew L Sniezek
(74) *Attorney, Agent, or Firm* — Zilka-Kotab, P.C.

(57) ABSTRACT

In one embodiment, a system for processing data includes a processor and logic integrated with and/or executable by the processor. The logic is configured to detect and track positive peak amplitudes and negative peak amplitudes of a readback waveform during data reading using a tracking threshold module, and to detect and track positive peak amplitudes and negative peak amplitudes of the readback waveform during the data reading at an input to an equalizer using a second tracking threshold module in response to reading a data set separator (DSS). Moreover, the logic is configured to perform asymmetry compensation on the data using an asymmetry compensator in an asymmetry compensation loop based on input from the tracking threshold module when not reading a DSS and based on input from the second tracking threshold module when reading a DSS, an output of the asymmetry compensator being provided to the equalizer.

17 Claims, 8 Drawing Sheets

(51) Int. Cl.
*G11B 5/02* (2006.01)
*G11B 20/10* (2006.01)
*G11B 5/008* (2006.01)

(52) U.S. Cl.
CPC .. *G11B 20/10018* (2013.01); *G11B 20/10027* (2013.01); *G11B 20/10046* (2013.01); *G11B 5/00813* (2013.01); *G11B 20/10055* (2013.01)

(58) Field of Classification Search
CPC ........ G11B 20/10018; G11B 20/10009; G11B 5/02; G11B 5/00813
See application file for complete search history.

(56) References Cited

U.S. PATENT DOCUMENTS

| | | | |
|---|---|---|---|
| 6,043,943 | A | 3/2000 | Rezzi et al. |
| 6,336,001 | B1 | 1/2002 | Kawamura et al. |
| 6,587,292 | B1 | 7/2003 | Ashley et al. |
| 7,161,522 | B1 | 1/2007 | Altekar et al. |
| 7,271,971 | B2 | 9/2007 | Hutchins et al. |
| 7,359,135 | B2 | 4/2008 | Hutchins et al. |
| 7,382,561 | B1 | 6/2008 | Hung |
| 7,436,615 | B2 | 10/2008 | Eleftheriou et al. |
| 7,443,623 | B2 | 10/2008 | Bui et al. |
| 7,495,854 | B2 | 2/2009 | Hutchins et al. |
| 7,589,927 | B2 | 9/2009 | Hutchins et al. |
| 7,596,176 | B2 | 9/2009 | Eleftheriou et al. |
| 7,623,309 | B2 | 11/2009 | Hodkinson |
| 7,821,733 | B2 | 10/2010 | Eleftheriou et al. |
| 7,924,524 | B2 | 4/2011 | Dahle et al. |
| 8,120,870 | B1 * | 2/2012 | Han ................ G11B 20/10037 360/25 |
| 8,477,447 | B1 | 7/2013 | Han |
| 9,159,358 | B1 | 10/2015 | Hutchins |
| 2006/0082915 | A1 | 4/2006 | Eleftheriou et al. |
| 2006/0285237 | A1 | 12/2006 | Bayang et al. |
| 2007/0076313 | A1 | 4/2007 | Hutchins et al. |
| 2008/0178060 | A1 | 7/2008 | Takashi et al. |
| 2013/0128374 | A1 | 5/2013 | Christensen et al. |

OTHER PUBLICATIONS

Non-Final Office Action from U.S. Appl. No. 14/331,169, dated Sep. 10, 2014.
Final Office Action from U.S. Appl. No. 14/331,169, dated Feb. 18, 2015.
Advisory Action from U.S. Appl. No. 14/331,169, dated Apr. 27, 2015.
Notice of Allowance from U.S. Appl. No. 14/331,169, dated Jun. 8, 2015.
Hutchins, R.A., U.S. Appl. No. 14/331,169, filed Jul. 14, 2014.
Hutchins, R.A., U.S. Appl. No. 15/656,939, filed Jul. 21, 2017.

* cited by examiner

ASYNCHRONOUS ASYMMETRY COMPENSATION FOR DATA READ FROM A STORAGE MEDIUM

BACKGROUND

The present invention relates to data storage, and more particularly, to asynchronously providing asymmetry compensation for data read from a data storage medium.

In magnetic data storage, and particularly when storing data to and retrieving data from magnetic tape, a given tape drive, in order to be most useful, should be able to read as many different types of magnetic tapes as possible, from multiple vendors and having different layouts. The magnetic tapes that are read may be manufactured by any of several different manufacturers. Furthermore, legacy magnetic tapes having outdated formats and layouts should also be able to be read by the tape drive. Because of this, the read-detection channel of the tape drive should be able to adapt to variations in readback signals that it might receive, across a family of magnetic tapes having different manufacturers and/or layouts.

Thus, it is desirable that the read-detection channel has the ability to adapt to a wide range of signals while ensuring that the adaptation is controlled and optimal.

BRIEF SUMMARY

According to one embodiment, a system for processing data includes a processor and logic integrated with and/or executable by the processor. The logic is configured to detect and track positive peak amplitudes and negative peak amplitudes of a readback waveform during data reading using a tracking threshold module. The logic is also configured to detect and track positive peak amplitudes and negative peak amplitudes of the readback waveform during the data reading at an input to an equalizer using a second tracking threshold module in response to reading a data set separator (DSS). Moreover, the logic is configured to perform asymmetry compensation on the data using an asymmetry compensator in an asymmetry compensation loop based on input from the tracking threshold module when not reading a DSS and based on input from the second tracking threshold module when reading a DSS, an output of the asymmetry compensator being provided to the equalizer.

In another embodiment, a method for processing data in a read channel includes detecting and tracking positive peak amplitudes and negative peak amplitudes of an equalized readback waveform using a tracking threshold module positioned on an output side of an equalizer in a tape read channel. The method also includes performing asymmetry compensation on data using an asymmetry compensator based only on input from the tracking threshold module in an asymmetry compensation loop, an output of the asymmetry compensator being provided to the equalizer.

According to another embodiment, a magnetic tape drive includes a processor and logic integrated with and/or executable by the processor. The logic is configured to detect and track positive peak amplitudes and negative peak amplitudes of an equalized readback waveform using a tracking threshold module positioned on an output side of an equalizer in a tape read channel. The logic is also configured to perform asymmetry compensation on data using an asymmetry compensator based only on input from the tracking threshold module in an asymmetry compensation loop, an output of the asymmetry compensator being provided to the equalizer.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

According to one general embodiment, a system for processing data includes a processor and logic integrated with and/or executable by the processor, the logic being configured to read data from a magnetic data storage medium using a read channel, detect and track positive peak amplitudes and negative peak amplitudes of a readback waveform during the data reading using a tracking threshold module, and perform asymmetry compensation on the data using an asymmetry compensator based on input from the tracking threshold module in an asymmetry compensation loop, wherein the asymmetry compensator does not rely on an input from path metrics in order to perform the asymmetry compensation.

In another general embodiment, a magnetic tape drive includes a processor and logic integrated with and/or executable by the processor, the logic being configured to read data from a magnetic tape using a read channel, equalize the data using an equalizer, detect and track positive peak amplitudes and negative peak amplitudes of a readback waveform using a tracking threshold module positioned on an output side of the equalizer, and perform asymmetry compensation on the data using an asymmetry compensator based on input from the tracking threshold module in an asymmetry compensation loop, wherein the asymmetry compensator does not rely on an input from path metrics in order to perform the asymmetry compensation.

According to another general embodiment, a method for processing data in a read channel includes reading data from a magnetic data storage medium using the read channel, detecting and tracking amplitudes of positive peaks and negative peaks of a readback waveform during the data reading using a tracking threshold module, and performing asymmetry compensation on the data using an asymmetry compensator based on input from the tracking threshold module in an asymmetry compensation loop, wherein the asymmetry compensator does not rely on an input from path metrics in order to perform the asymmetry compensation.

Figure 1A:
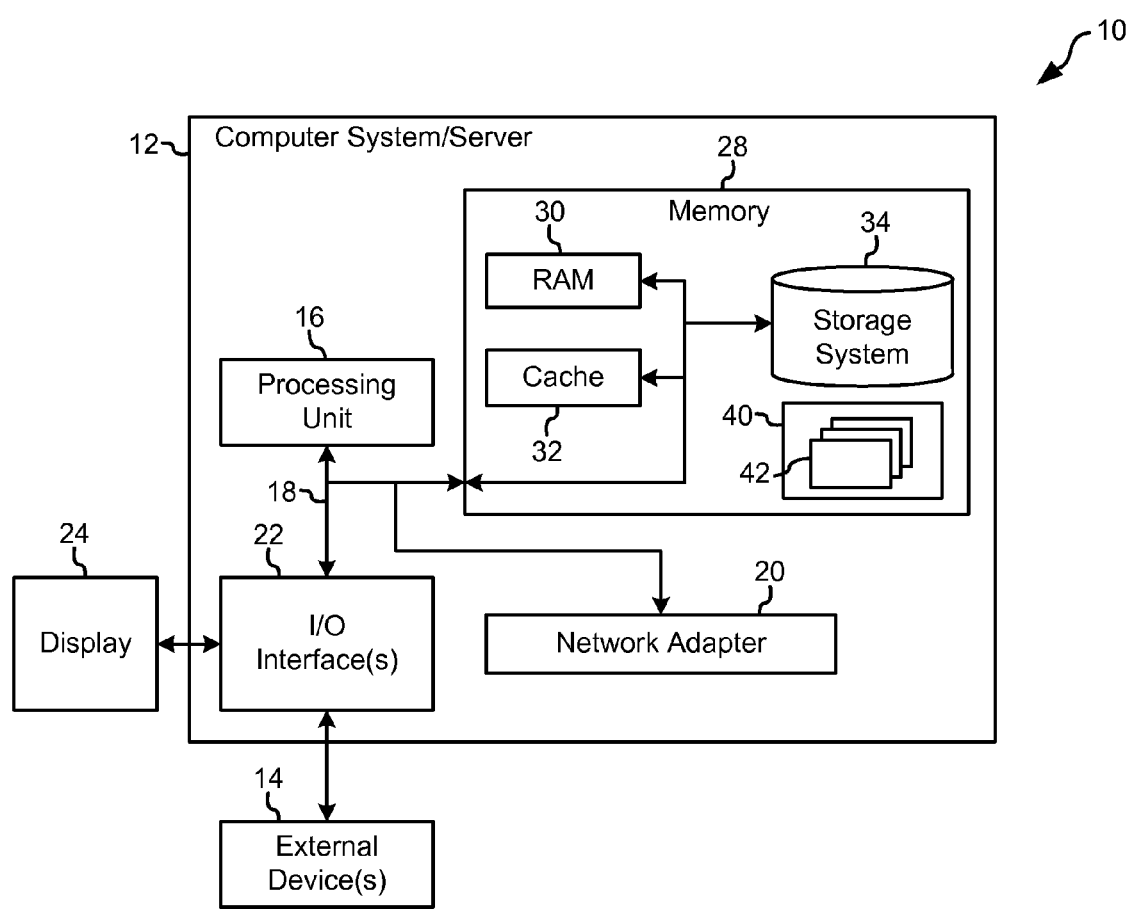
FIG. 1A illustrates a network storage system, according to one embodiment.

Referring now to FIG. 1A, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
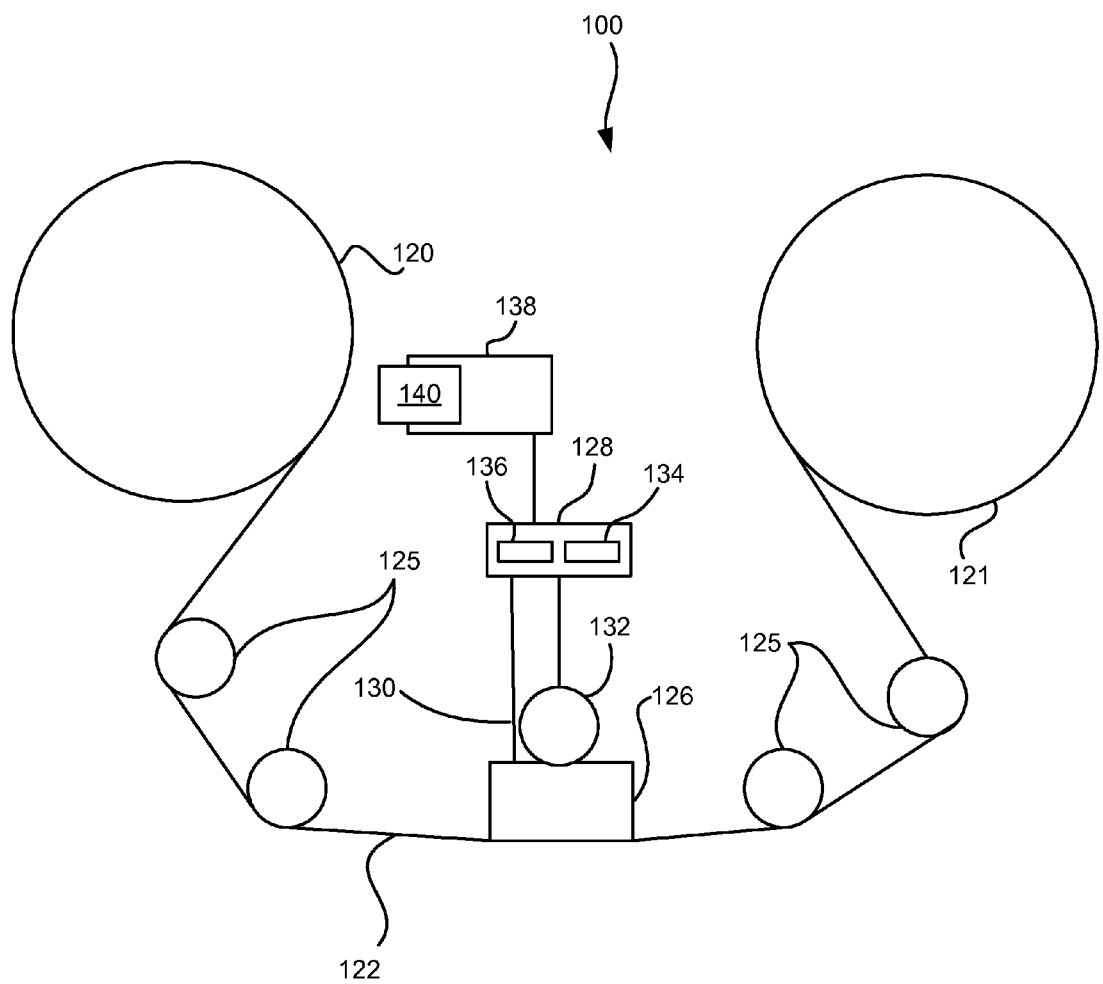
FIG. 1B illustrates a simplified tape drive of a tape-based data storage system, according to one embodiment.

FIG. 1B illustrates a simplified tape drive 100 of a tape-based data storage system, which may be employed according to various embodiments. While one specific implementation of a tape drive is shown in FIG. 1B, it should be noted that the embodiments described herein may be implemented in the context of any type of tape drive system. As shown, a tape supply cartridge 120 and a take-up reel 121 are provided to support a tape 122. One or more of the reels may form part of a removable cassette and are not necessarily part of the tape drive 100. The tape drive 100, such as that illustrated in FIG. 1B, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 1B) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be organized as a ring buffer and may be split into one or more portions, with one portion being a reserved data buffer 140, which may also be organized into a ring buffer, to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

In order to achieve high adaptability, there are many different adaptive loops included in typical magnetic tape drives: a least means square (LMS) adaptive equalization loop, an asymmetry compensation loop, a gain control loop, a data dependent noise-predictive maximum likelihood (DD-NPML) parameter loop, etc. These loops adapt specific parameters to provide stable response under a wide range of conditions. Unfortunately, some of these loops may be fully contained within other loops or may be partially contained within other loops. When this loop overlap occurs, there may be interaction between the overlapping loops, especially when operating under high-noise conditions, which may cause the loops to work against each other instead in concert with one another, thereby resulting in increased instability.

According to embodiments described herein, two of the primary loops in the data storage medium recording channel may be decoupled from one another. Specifically, the two loops which may be decoupled from one another are the LMS equalization loop and the asymmetry compensation loop.

In order to accomplish this decoupling, a method is described for waveform asymmetry compensation designed to work with an LMS equalization loop architecture. An advantage of this method, in one embodiment, is that it decouples the LMS equalization loop from the asymmetry compensation loop. This prevents the two loops from interacting and working against each other in high noise conditions.

Figure 2:
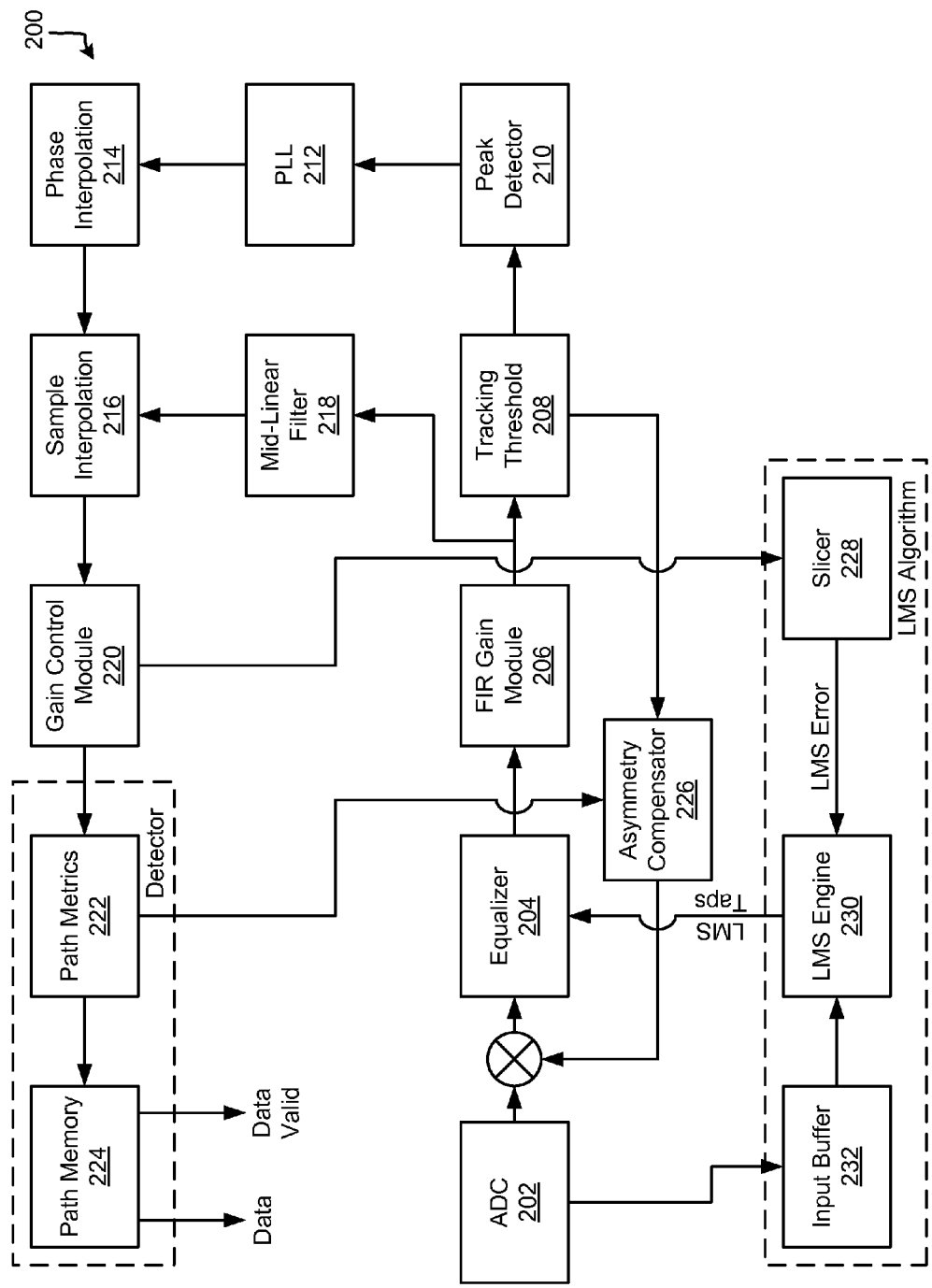
FIG. 2 shows an exemplary read channel architecture, according to one embodiment.

Referring now to FIG. 2, an exemplary read-channel 200 architecture is shown. The read channel 200 includes an analog-to-digital converter (ADC) 202 which provides data to an equalizer 204, which may employ a filter such as a finite impulse response (FIR) filter which may be controlled by a least means square (LMS) algorithm executed on an LMS engine 230, a FIR gain module 206, a tracking threshold module 208, a peak detector 210, a phase-locked-loop (PLL) module 212, a phase interpolation module 214, a mid-linear filter 218, a sample interpolation module 216, a gain control module 220, various path metrics 222, path memory 224, an asymmetry compensator 226, a slicer 228, and an input buffer 232.

As can be seen in FIG. 2, the asymmetry compensation loop (which includes outputs from the tracking threshold module 208 and the path metrics 222 overlaps with the LMS equalization loop (which includes outputs from the gain control module 220 and the ADC 202 while also providing an input to the equalizer 204).

In one embodiment, the equalizer 204 may utilize a FIR filter, and therefore the terms may be used interchangeably. The FIR filter of the equalizer 204 may have any number of taps such as 9 taps, 11 taps, 22 taps, 21 taps, etc., and in one architecture, the FIR filter of the equalizer 204 may have 17 taps. However, any number of FIR taps may be used, e.g., ranging from 7 FIR taps up to and including 25 FIR taps.

During a read operation in a magnetic tape drive, analog data is received from the magnetic tape (or some buffer positioned between the magnetic tape and the equalizer 204) at an input to an analog-to-digital converter (ADC) 202. The ADC 202 outputs a digitized form of this analog data. The digital data is then filtered by the equalizer 204 and then processed by numerous other blocks, such as the PLL module 212, the phase interpolation module 214, the mid-linear filter 218, the sample interpolation module 216, the gain control module 220, passed through various path metrics 222, stored in the path memory 224, among other known components of a read-channel architecture not specifically described herein. In addition, the data input from the ADC 202 may be stored in an input buffer 232 of a type known in the art. For the sake of this description, it may be assumed that each of these other components function and behave in accordance with preconceptions and understandings of those of skill in the relevant art.

Ultimately, the binary sequence that was written on the data storage medium, such as a magnetic tape, is decoded and correctly output from the read-channel 200 after passing to the path memory 224.

With this architecture, the input to the asymmetry compensator 226 from the tracking threshold module 208 is only used by the asymmetry compensator 226 in an acquisition mode, e.g., when detecting a data track on a magnetic tape to acquire the actual data signal. This input from the tracking threshold module 208 is not used under any other circumstances. Once the asymmetry compensator 226 has acquired an initial asymmetry estimate, it switches the source of the input from the tracking threshold module 208 to the path metrics 222 so that the feedback path from the tracking threshold module 208 is no longer used.

In this architecture, problems have been encountered where the LMS equalization loop and the asymmetry compensation loop appear to interact with one another and cause instability in both of the loops.

Figure 3:
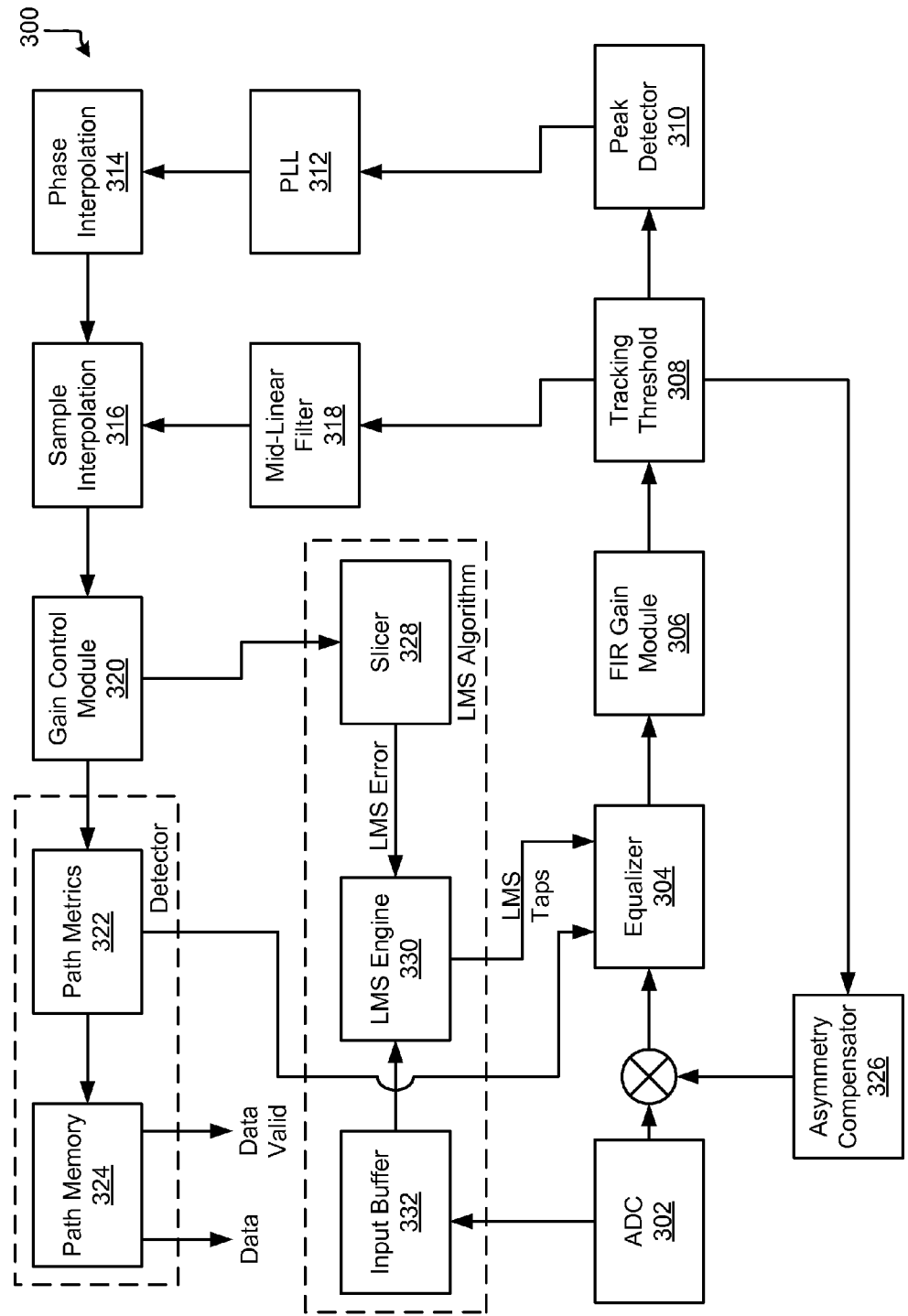
FIG. 3 shows a read-channel architecture, according to one embodiment.

Therefore, to alleviate this problem, in one embodiment as shown in FIG. 3, a read channel 300 architecture has been designed where the asymmetry compensator 326 may be used independently from the tracking threshold module 308. In this architecture, the tracking threshold module 308 is allowed to directly control the asymmetry compensator 326. The other components of this read channel 300 architecture behave generally as indicated previously, with an ADC 302 providing data to an equalizer 304, which may employ a filter such as a FIR filter which may be controlled by an LMS algorithm executed on an LMS engine 330, a FIR gain module 306, a tracking threshold module 308, a peak detector 310, a PLL or other suitable module 312, a phase interpolation module 314, a mid-linear filter 318, a sample interpolation module 316, a gain control module 320, various path metrics 322, a path memory 324, an asymmetry compensator 326, a slicer 328, and an input buffer 332.

The control of the asymmetry compensator 326 acts to alleviate the problem of the LMS equalization loop interacting with the asymmetry compensation loop. The tracking threshold module 308 only operates when the reader head is positioned above a data set separator (DSS) pattern or sequence of the magnetic medium, such as a magnetic tape. The DSS pattern is positioned between each data set on the magnetic medium indicating a next data set. While reading the DSS pattern, the LMS equalization loop is inactive. However, the source of the asymmetry compensation error from the tracking threshold module 308 is still contained within the LMS equalization loop. Therefore, there is still a possibility of loop interaction.

Figure 4:
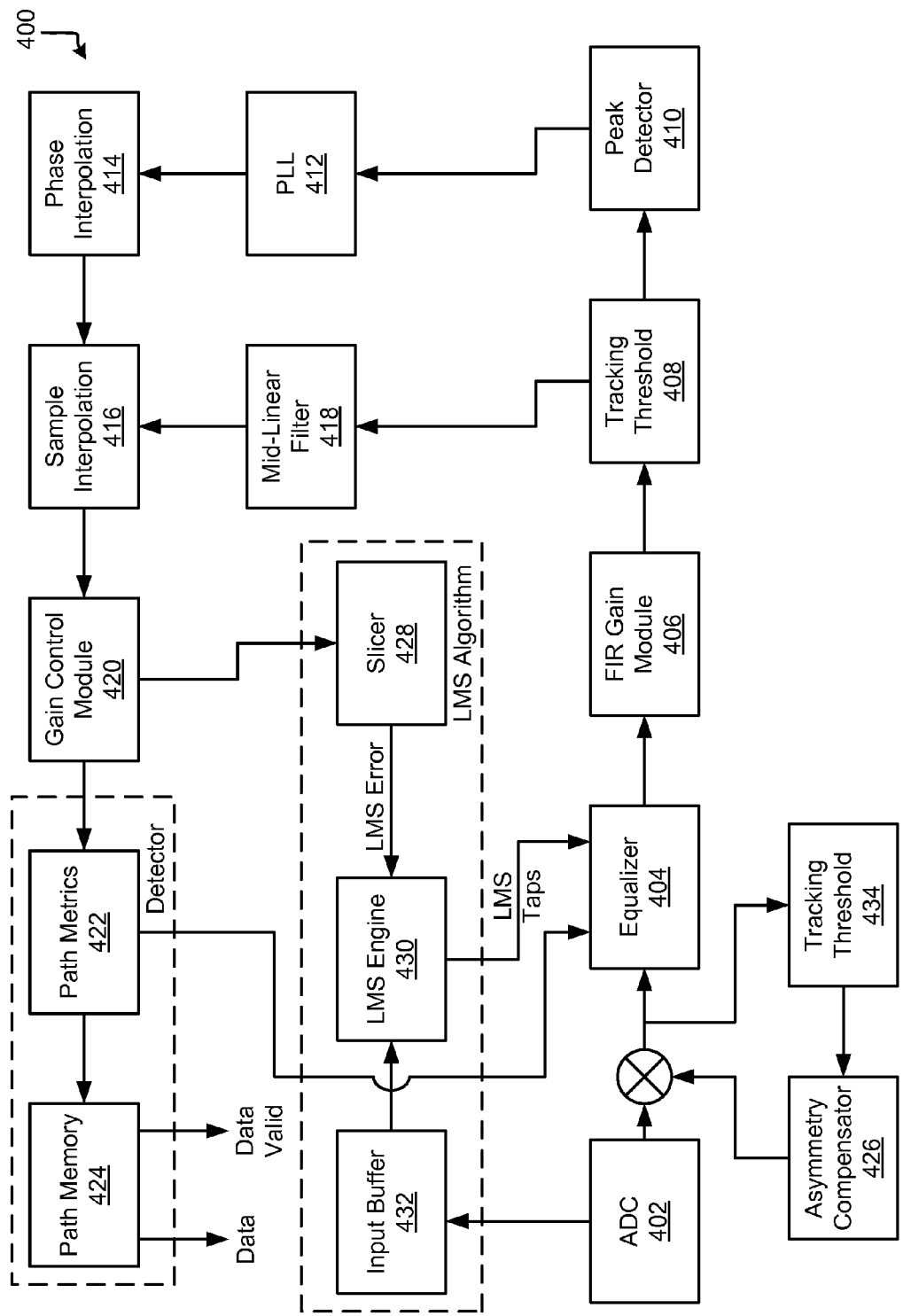
FIG. 4 shows a read-channel architecture, according to another embodiment.

In order to completely decouple the loops, another read channel 400 architecture is described in FIG. 4, according to one embodiment. In this read channel 400 architecture, a peak tracking threshold module 434 is included in addition to the (original) tracking threshold module 408.

The other components of this read channel 400 architecture behave generally as indicated previously, with an ADC 402 providing data to an equalizer 404, which may employ a filter such as a FIR filter which may be controlled by an LMS algorithm executed on an LMS engine 430, a FIR gain module 406, a tracking threshold module 408, a peak detector 410, a PLL or other suitable module 412, a phase interpolation module 414, a mid-linear filter 418, a sample interpolation module 416, a gain control module 420, various path metrics 422, a path memory 424, an asymmetry compensator 426, a slicer 428, and an input buffer 432.

In one embodiment, the sole function or purpose of the peak tracking threshold module 434 is to track peak amplitudes of a waveform of the data (a readback signal) at the input to the equalizer 404 rather than the output of the equalizer 404. The peak tracking threshold module 434 tracks positive peak amplitude and negative peak amplitude of the readback waveform. It is clear from FIG. 4 that there is no possibility of interaction between the asymmetry compensation loop and any of the other loops. Significant changes are made to the peak tracking threshold module 434 in order to achieve this decoupling of the loops. The waveform received by the peak tracking threshold module 434 has not been equalized, and therefore the positive peaks and negative peaks may be bi-modal and not single peaks, as desirable, like they are in the waveform at the output of the equalizer 404.

Figure 5:
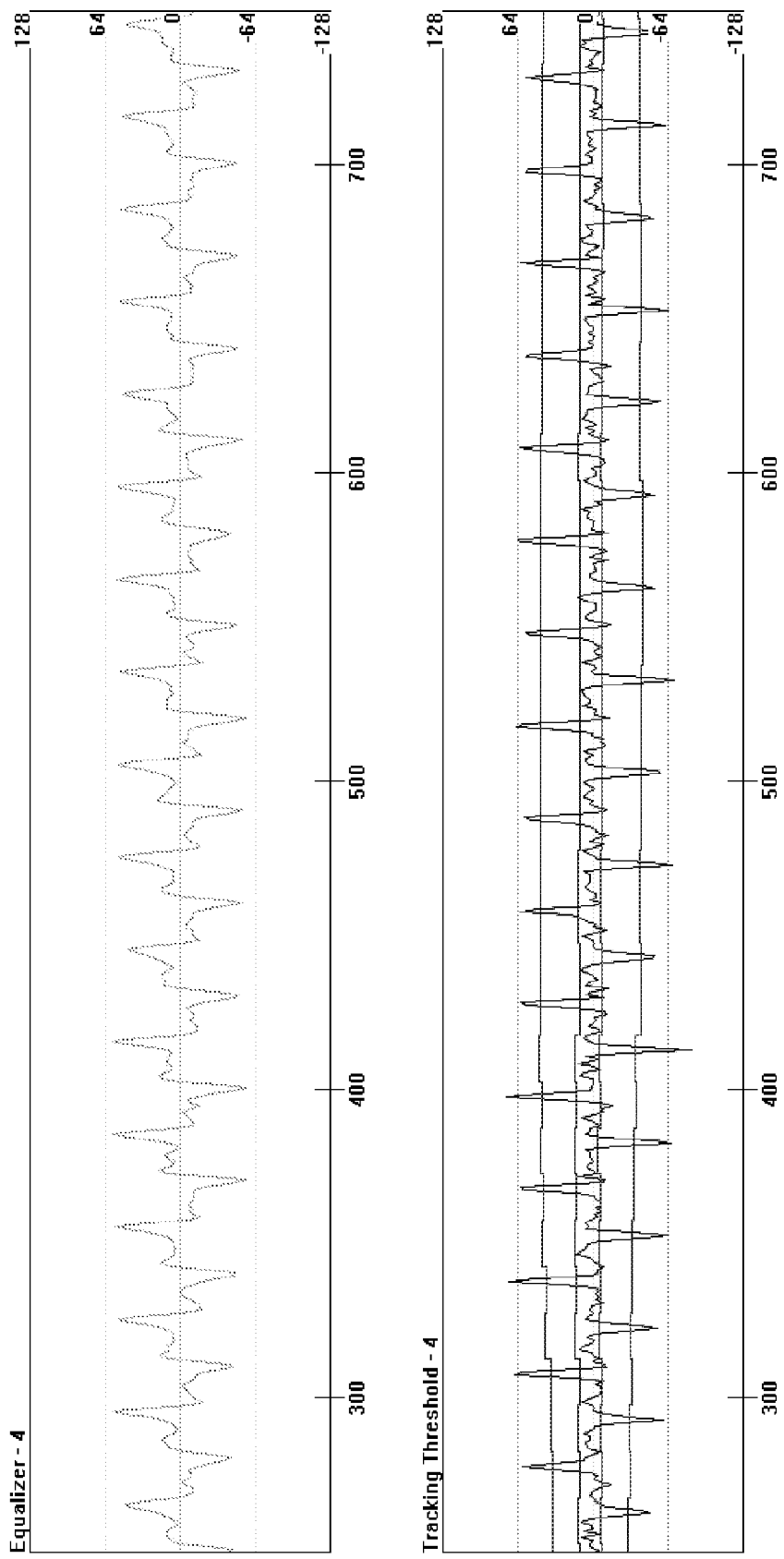
FIG. 5 shows a chart of a waveform at the input and output of an equalizer, according to one embodiment.

Now referring to FIG. 5, a waveform (readback signal) is shown at the input to the equalizer in the upper chart (labeled Equalizer-4), and at the output of the equalizer in the lower chart (labeled as Tracking Threshold-4). The upper chart shows how a bi-modal peak may appear to the peak tracking threshold module before being equalized. Due to this, processing the waveform prior to the equalizer involves processing imperfect or bi-modal peaks, whereas processing the waveform at the equalizer output involves processing distinct peaks.

Therefore, the peak tracking threshold module at the input to the equalizer, in one embodiment, may be modified in comparison to the tracking threshold module at the output of the equalizer so that it is configured to process waveforms that might have multiple peaks. The logic is configured so that once a positive peak is detected, when another positive peak occurs prior to a negative peak, then the largest of the two positive peaks is used as the value for the asymmetry compensator. Similarly, once a negative peak is detected, when another negative peak occurs before a positive peak, then the most negative of the two negative peaks are used as the value for the asymmetry compensator.

This is one embodiment of logic which may be used to process bi-modal and imperfect peaks in the peak tracking threshold module.

Figure 6:
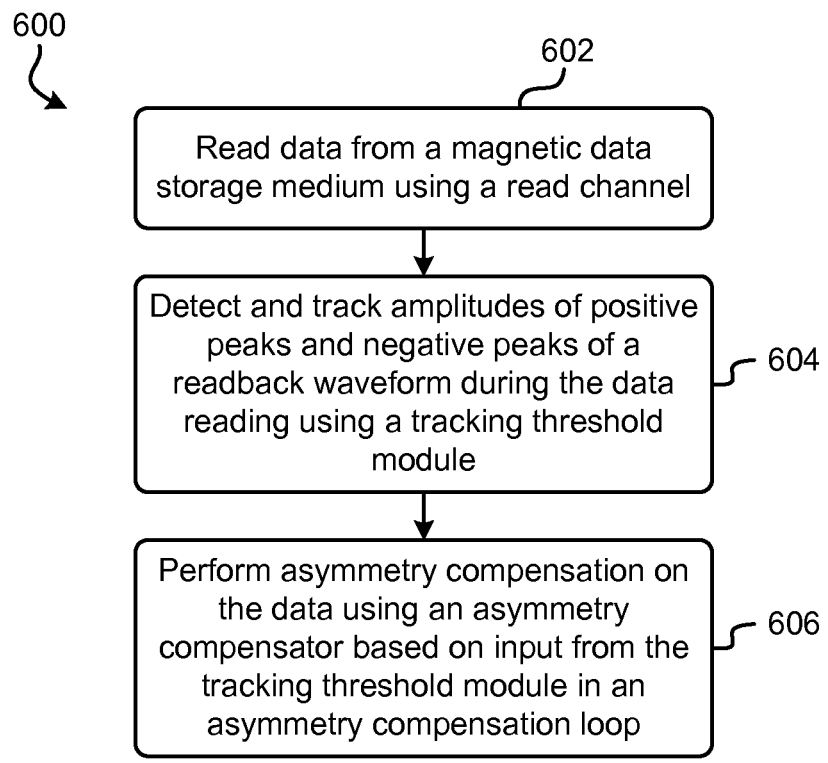
FIG. 6 is a flowchart of a method according to one embodiment.

Now referring to FIG. 6, a flowchart of a method 600 for processing data using a read channel is shown according to one embodiment. The method 600 may be performed in accordance with the present invention in any of the environments depicted in FIGS. 1A-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a magnetic tape drive or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a switching ASIC, a field programmable gate array (FPGA), etc., combinations thereof, or any other suitable computing device known in the art.

As shown in FIG. 6, method 600 may initiate with operation 602, where data is read from a magnetic data storage medium using a read channel. In various embodiments, the magnetic data storage medium may be a magnetic tape, an optical disk, a hard disk, etc. Certain aspects of the method 600 may change depending on what type of magnetic data storage medium is being read and having data thereof processed, but the overall scheme should translate across many different media platforms.

In operation 604, positive peak amplitudes and negative peak amplitudes of a waveform of the data (readback signal) are detected and tracked using a tracking threshold module. In this way, the asymmetry block may determine, for each detected peak in the waveform, whether an amplitude of the positive peak is different than the amplitude of the negative peak, which when such a condition is detected is referred to as waveform asymmetry.

In operation 606, asymmetry compensation is performed on the data using an asymmetry compensator based on input from the tracking threshold module in an asymmetry compensation loop. In this way, any waveform asymmetry may be adjusted based on asymmetry of the head and magnetic data storage medium during the reading operation.

In method 600, the asymmetry compensator does not rely on an input from path metrics in order to perform the asymmetry compensation. This allows for the asymmetry compensator to be decoupled from the path metrics. Any path metrics known in the art may be used for reading/decoding data from the magnetic data storage medium as are known to those of skill in the art.

Method 600 may further comprise equalizing the data using an equalizer that executes a LMS algorithm in an LMS equalization loop. This equalization process may be performed according to any method known in the art, as long as the LMS equalization loop relies on an input from the path metrics.

In a further embodiment, the asymmetry compensation may be at least partially based on an output of the equalizer, and the LMS equalization loop may be at least partially decoupled from the asymmetry compensation loop. As shown in FIG. 3, the asymmetry compensation loop may comprise the equalizer 304, FIR gain module 306, tracking threshold module 308, and the asymmetry compensator 326.

Referring again to FIG. 6, in another embodiment, method 600 may further comprise detecting and tracking the positive and negative peak amplitudes of the received waveform during the data reading at an input to the equalizer using a second tracking threshold module when reading a DSS. In this embodiment, the asymmetry compensation performed using the asymmetry compensator may be based on input from the second tracking threshold module when reading a DSS instead of the first tracking threshold module indicated in operation 604. Furthermore, the asymmetry compensation loop may comprise the second tracking threshold module and the asymmetry compensator thereby allowing the LMS equalization loop to be fully decoupled from the asymmetry compensation loop in this approach. This arrangement is shown in FIG. 4 according to one embodiment.

In any embodiment described in relation to method 600 in FIG. 6, the detecting and tracking of the positive and negative peak amplitudes of the received waveform may be performed on the data only when reading a DSS when using a tracking threshold module that is configured for such operation on an input side of the equalizer. A tracking threshold module which is positioned on an output side of the equalizer may be used for tracking calculations during other times.

Figure 7:
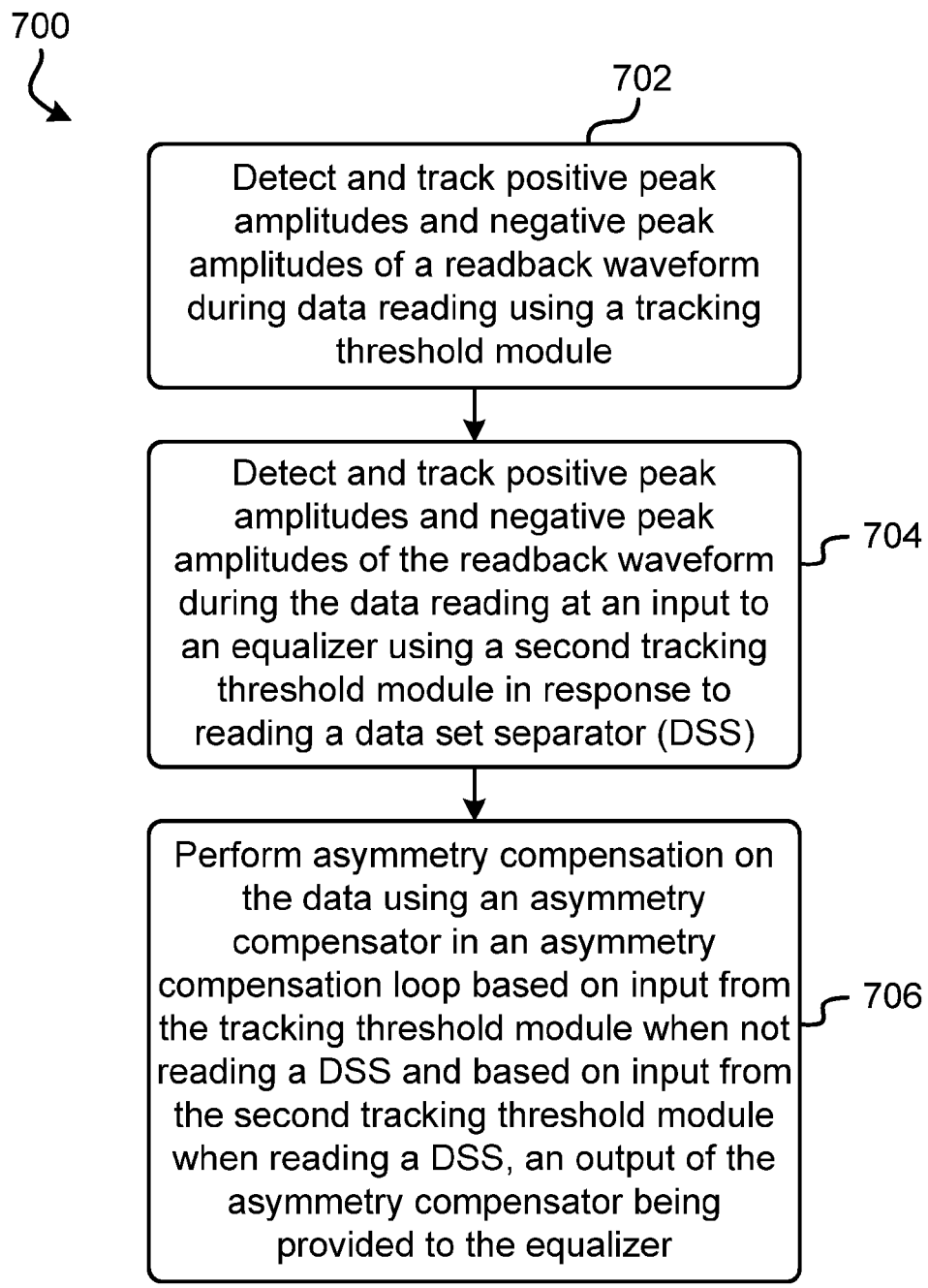
FIG. 7 is a flowchart of a method according to one embodiment.

Now referring to FIG. 7, a flowchart of a method 700 for processing data is shown according to one embodiment. The method 700 may be performed in accordance with the present invention in any of the environments depicted in FIGS. 1A-5, among others, in various embodiments. Of course, more or less operations than those specifically described in FIG. 67 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a magnetic tape drive or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a switching ASIC, a field programmable gate array (FPGA), etc., combinations thereof, or any other suitable computing device known in the art.

As shown in FIG. 7, method 700 may initiate with operation 702, where positive peak amplitudes and negative peak amplitudes of a readback waveform are detected and tracked during data reading using a tracking threshold module.

In operation 704, positive peak amplitudes and negative peak amplitudes of the readback waveform are detected and tracked at an input to an equalizer using a second tracking threshold module in response to reading a DSS.

In this way, the asymmetry block may determine, for each detected peak in the waveform, whether an amplitude of the positive peak is different than the amplitude of the negative peak, which when such a condition is detected is referred to as waveform asymmetry.

In operation 706, asymmetry compensation is performed on the data using an asymmetry compensator based on input from the tracking threshold module in an asymmetry compensation loop when not reading a DSS, and based on input from the second tracking threshold module when reading a DSS. In this way, any waveform asymmetry may be adjusted based on asymmetry of the head and magnetic data storage medium during the reading operation. An output of the asymmetry compensator is provided to an equalizer.

In method 700, the asymmetry compensator does not rely on an input from path metrics in order to perform the asymmetry compensation. This allows for the asymmetry compensator to be decoupled from the path metrics. Any path metrics known in the art may be used for reading/decoding data from the magnetic data storage medium as are known to those of skill in the art.

Method 700 may further comprise equalizing the data using an equalizer that executes a LMS algorithm in an LMS equalization loop. This equalization process may be performed according to any method known in the art, as long as the LMS equalization loop relies on an input from the path metrics.

In a further embodiment, the asymmetry compensation may be at least partially based on an output of the equalizer, and the LMS equalization loop may be fully decoupled from the asymmetry compensation loop. As shown in FIG. 4, the asymmetry compensation loop may comprise the equalizer 404, FIR gain module 406, the asymmetry compensator 426, and one of the tracking threshold module 408 or the peak tracking threshold module 434, depending on whether a DSS is being read.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system for processing data, the system comprising a processor and logic integrated with and/or executable by the processor, the logic being configured to:
    detect and track positive peak amplitudes and negative peak amplitudes of a readback waveform during data reading using a first tracking threshold module positioned in a tape read channel;
    detect and track positive peak amplitudes and negative peak amplitudes of the readback waveform during the data reading at an input to an equalizer using a second tracking threshold module in response to reading a data set separator (DSS); and perform asymmetry compensation on the data using an asymmetry compensator in an asymmetry compensation loop based on input from the first tracking threshold module when not reading a DSS and based on input from the second tracking threshold module when reading a DSS, an output of the asymmetry compensator being provided to the equalizer.

2. The system as recited in claim 1, wherein the logic is configured to equalize the data using the equalizer, the equalizer executing a least means square (LMS) algorithm in an LMS equalization loop.

3. The system as recited in claim 2, wherein the LMS equalization loop is fully decoupled from the asymmetry compensation loop.

4. The system as recited in claim 1, wherein the asymmetry compensation loop comprises the equalizer, a finite impulse response (FIR) gain module, the asymmetry compensator, and one of the first tracking threshold module or the second tracking threshold module depending on whether a DSS is being read.

5. The system as recited in claim 1, wherein the logic is configured to read the data from a magnetic data storage medium using the read channel to produce the readback waveform.

6. The system as recited in claim 5, wherein the magnetic data storage medium is a magnetic tape.

7. A method for processing data in a read channel, the method comprising:

detecting and tracking positive peak amplitudes and negative peak amplitudes of a readback waveform during data reading using a first tracking threshold module positioned on an output side of an equalizer in a tape read channel;

detecting and tracking positive peak amplitudes and negative peak amplitudes of the readback waveform during the data reading at an input to the equalizer using a second tracking threshold module in response to reading a data set separator (DSS); and performing asymmetry compensation on data using an asymmetry compensator based on input from the first tracking threshold module in an asymmetry compensation loop when not reading a DSS and based on input from the second tracking threshold module when reading a DSS, an output of the asymmetry compensator being provided to the equalizer.

8. The method as recited in claim 7, comprising equalizing the data using the equalizer that executes a least means square (LMS) algorithm in an LMS equalization loop.

9. The method as recited in claim 8, wherein the LMS equalization loop is partially decoupled from the asymmetry compensation loop, and wherein the asymmetry compensation loop comprises the equalizer, a finite impulse response (FIR) gain module, the asymmetry compensator, and one of the first tracking threshold module or the second tracking threshold module depending on whether a DSS is being read.

10. The method as recited in claim 8,
wherein the LMS equalization loop is fully decoupled from the asymmetry compensation loop, and
wherein the asymmetry compensation loop comprises the second tracking threshold module and the asymmetry compensator.

11. The method as recited in claim 7, comprising reading data from a magnetic data storage medium using the read channel to produce the readback waveform.

12. The method as recited in claim 11, wherein the magnetic data storage medium is a magnetic tape.

13. A magnetic tape drive, comprising a processor and logic integrated with and/or executable by the processor, the logic being configured to:

detect and track positive peak amplitudes and negative peak amplitudes of a readback waveform during data reading using a first tracking threshold module positioned on an output side of an equalizer in a tape read channel;

detect and track positive peak amplitudes and negative peak amplitudes of the readback waveform during the data reading at an input to the equalizer using a second tracking threshold module in response to reading a data set separator (DSS); and perform asymmetry compensation on data using an asymmetry compensator based on input from the first tracking threshold module in an asymmetry compensation loop when not reading a DSS and based on input from the second tracking threshold module when reading a DSS, an output of the asymmetry compensator being provided to the equalizer.

14. The magnetic tape drive as recited in claim 13, wherein the logic is configured to:

equalize the data using the equalizer, the equalizer being configured to execute a least means square (LMS) algorithm in an LMS equalization loop.

15. The magnetic tape drive as recited in claim 14, wherein the LMS equalization loop is partially decoupled from the asymmetry compensation loop, and
wherein the asymmetry compensation loop comprises, the equalizer, a finite impulse response (FIR) gain module, the asymmetry compensator, and one of the first tracking threshold module or the second tracking threshold module depending on whether a DSS is being read.

16. The magnetic tape drive as recited in claim 14,
wherein the LMS equalization loop is fully decoupled from the asymmetry compensation loop.

17. The magnetic tape drive as recited in claim 13, wherein the logic is configured to read data from a magnetic tape using the read channel.

* * * * *